United States Patent
Haveman et al.

(10) Patent No.: US 10,882,944 B2
(45) Date of Patent: Jan. 5, 2021

(54) UREA URETHANES (II)

(71) Applicant: CLiQ SwissTech GmbH, Bergisch Gladbach (DE)

(72) Inventors: Daniel Haveman, Steenwijk (NL); Adrianus Peter Van Veen, Leek (NL); Neeltje Wijma, Kootstertille (NL)

(73) Assignee: CLiQ SwissTech B.V., Groningen (NL)

( * ) Notice: Subject to any disclaimer, the term of this patent is extended or adjusted under 35 U.S.C. 154(b) by 0 days.

(21) Appl. No.: 16/131,899

(22) Filed: Sep. 14, 2018

(65) Prior Publication Data

US 2019/0135969 A1    May 9, 2019

(30) Foreign Application Priority Data

Sep. 22, 2017 (EP) .................... 17192570

(51) Int. Cl.

| | | |
|---|---|---|
| *C08G 18/38* | (2006.01) | |
| *C08G 18/76* | (2006.01) | |
| *C08G 18/10* | (2006.01) | |
| *C09D 5/04* | (2006.01) | |
| *C09D 7/43* | (2018.01) | |
| *C09D 175/02* | (2006.01) | |
| *C08G 71/02* | (2006.01) | |
| *C08G 18/28* | (2006.01) | |
| *C08G 18/32* | (2006.01) | |
| *C08G 18/48* | (2006.01) | |
| *C09D 7/65* | (2018.01) | |
| *C08G 18/66* | (2006.01) | |

(52) U.S. Cl.
CPC ......... *C08G 18/3819* (2013.01); *C08G 18/10* (2013.01); *C08G 18/283* (2013.01); *C08G 18/3243* (2013.01); *C08G 18/4833* (2013.01); *C08G 18/4862* (2013.01); *C08G 18/6685* (2013.01); *C08G 18/7621* (2013.01); *C08G 71/02* (2013.01); *C09D 5/04* (2013.01); *C09D 7/43* (2018.01); *C09D 7/65* (2018.01); *C09D 175/02* (2013.01)

(58) Field of Classification Search
CPC ............ C08G 18/3819; C08G 18/7621; C08G 18/10; C08G 18/283; C08G 18/4862; C08G 18/6685; C08G 71/02; C08G 18/3243; C08G 18/4833; C09D 5/04; C09D 175/02; C09D 7/65; C09D 7/43
See application file for complete search history.

(56) References Cited

U.S. PATENT DOCUMENTS

| | | | |
|---|---|---|---|
| 3,075,930 A * | 1/1963 | Stewart .................. | C08J 9/0061 521/102 |
| 3,499,858 A * | 3/1970 | Strassel .................. | C08G 18/10 524/714 |
| 4,314,924 A * | 2/1982 | Haubennestel ... | C07C 273/1827 524/173 |
| 6,420,466 B1 * | 7/2002 | Haubennestel ...... | C08G 18/225 524/195 |
| 2007/0259120 A1 | 11/2007 | Haubennestel et al. | |
| 2011/0265691 A1 * | 11/2011 | Orth ....................... | C07C 273/18 106/505 |
| 2018/0282553 A1 * | 10/2018 | Haveman ................ | C09D 5/04 |

FOREIGN PATENT DOCUMENTS

EP    1048681 A2    11/2000

OTHER PUBLICATIONS

Allport, D. C. et al., Editors, MDI and TDI: Safety, Health and the Environment. A Source Book and Practical Guide, John Wiley & Sons, Ltd., 2003, pp. 229-276.*
Odian, George, Principles of Polymerization, Third Edition, John Wiley & Sons, Inc., 1991, pp. 19-24.*
O'Shaughnessy et al., "Interfacial Reaction Kinetics", Eur. Phys, J. E 1, (2000), pp. 159-177.*

* cited by examiner

*Primary Examiner* — Patrick D Niland
(74) *Attorney, Agent, or Firm* — Dilworth & Barrese, LLP (57) ABSTRACT

Suggested is a urea urethane with improved rheological properties, obtainable or obtained according to a process encompassing or consisting of the following steps:
(a) providing a monohydroxyl compound;
(b) providing a diisocyanate compound;
(c) reacting said monohydroxyl compound and said diisocyanate compound to form a pre-polymer;
(d) reacting said pre-polymer with a diamine compound,
Wherein said pre-polymer and said diamine are reacted in the presence of a surfactant.

22 Claims, 4 Drawing Sheets

UREA URETHANES (II)

This application claims priority to European Patent Application No. 17192570.4 filed on Sep. 22, 2017, the entire contents of which are incorporated by reference herein.

FIELD OF INVENTION

The present invention is related to coating additives and covers urea urethanes with improved rheological behavior, thixotropic agents comprising them, a process for their manufacture and their use as additives for coatings, lacquers and paints.

STATE OF THE ART

To control the rheology of liquid coating compounds, organically modified bentonites, silicic acids, hydrogenated castor oil and polyimide waxes are predominantly used. A disadvantage of these substances is that they are generally dry solids that have to be dispersed by means of solvents and shear forces to form semi-finished products or be introduced into the liquid coating compound by systematic temperature control. If these temperatures are not maintained, crystallites, which may result in defects in the coating, occur in the finished coating compound.

The general disadvantage of these rheological auxiliaries used at present is that they result in turbidities and clouds (haze) in clear, transparent coatings. In addition, handling dry, powdered products causing dusts during processing is undesirable.

Other achievements relating to rheology control were disclosed in European Patent Application EP 0198 519 B1 (AKZO). In the latter, an isocyanate is reacted with an amine in the presence of paint resin solutions to form a urea that forms needle-shaped crystals in very finely dispersed form. These paint binders modified in this way are offered as rheology-control agents and sag-preventing binders, as so-called "sag control agents".

The disadvantage of these products, however, is the result of the fact that they are always bound to the binder in which they have been prepared and do not permit any subsequent universal correction of finished coating agents.

European Patent EP 0006252 B1 (BYK CHEMIE) describes a process for preparing a thixotropic agent that eliminates some of the abovementioned disadvantages by describing urea urethanes that are prepared in aprotic solvents in the presence of LiCl by reacting isocyanate adducts with polyamines. The disadvantage of the products prepared in this way is the undefined structure of said urea urethanes due to the preparation process. Although isocyanate monoadducts are described, there are in fact no monoadducts at all in this case, as becomes clearly apparent from the Example, but mixtures of different adducts. In the process described, one mole of a diisocyanate is first reacted with one mole of a monoalcohol. This process partly produces the desired NCO-functional monoadducts, but also diadducts with no NCO-functionality. In addition, a proportion of the monomeric diisocyanate remains unreacted.

The proportions of these different compounds may vary, depending on the accessibility of the NCO group and the reaction conditions applied, such as temperature and time. The reason for the greatest disadvantage is, however, that all these adducts prepared in this way contain fairly large amounts of unreacted diisocyanate that, during the further reaction with polyamines in the presence of lithium chloride, results in uncontrolled chain extension of the urea urethane and in polymeric urea compounds. These products then have a tendency to precipitation and can be kept in solution only with the greatest difficulty.

A solution to this problem is provided by European patent EP 1048681 B1 (BYK CHEMIE) proposing to conduct the reaction explained above using molar excess of the diisocyanate compound of at least 1.5, preferably of about 2 to 3 and up to 5. The unreacted diisocyanate is separated off for example by vacuum distillation.

A major drawback of the processes described above is linked to the fact that they require the presence of lithium salts as an initiator for forming the urethanes. Once said urethanes are formulated into a ready-to-use additive they also serve as stabilizers for the final customer products, such as for example paints and lacquers. Notwithstanding these benefits, lithium salts are still under objection, since they are highly corrosive. Another drawback of lithium is that its sources are limited and its production is usually harmful for environment.

Therefore, it has been the object of the present invention to identify alternative stabilizers for the polyurethane reaction, which at the same time provide stability to the formulations, while being non-corrosive or at least less corrosive, so that the presence of lithium salts, in particular of lithium chloride or lithium nitrate during the manufacturing process can be avoided. A second object of the invention is providing thixotropic agents bases on urea urethanes which are either free of lithium or show at least a reduced amount when compared to products found in the market.

DESCRIPTION OF THE INVENTION

A first object of the present invention is directed to a urea urethane, obtainable or obtained according to a process encompassing or consisting of the following steps:
(a) providing a monohydroxyl compound of formula (I) R—OH (I) in which R is n-alkyl or isoalkyl containing 4 to 22 carbon atoms, cycloalkyl containing 6 to 12 carbon atoms, aralkyl containing 7 to 12 carbon atoms or a radical of the formula $C_mH_{2m+1}(O-C_nH_{2n})_x$— or $C_mH_{2m+1}(OOC-C_vH_{2v})_x$—, and m stands for an integer of from 1 to 22, n stands for an integer of 2 to 4, x for an integer of 1 to 15 and v means 4 or 5;
(b) providing a diisocyanate compound of formula (II)

$$OCN-[A]-NCO \qquad (II)$$

in which A stands for a linear or branched alkylene radical having 2 to 10 carbon atoms and/or a toluylene radical;
(c) reacting said monohydroxyl compound and said diisocyanate compound to form a pre-polymer;
(d) reacting said pre-polymer with a diamine compound, said diamine compound being selected from the group consisting of
(d1) compound (III)

$$H_2N-[B]-NH_2 \qquad (III)$$

where B stands for a linear, branched and/or cyclical-kylene group having 2 to 12 carbon atoms; and/or
(d2) compound (IV)

$$H_2N-(CH_2)_a-Ph-(CH_2)_b NH_2 \qquad (IV)$$

in which a and b represent independent from each other integers from 1 to 5 and Ph stands for a phenyl- or toluylene-radical wherein said pre-polymer and said diamine are reacted in the presence of a solvent and a surfactant. The solvent may also be added after the reaction of pre-polymer and diamine.

Surprisingly, it has been observed that the formation of polyurethanes from isocyanates and amines occurs rapidly and in high yields when surfactants are present. Customer products comprising the urea urethanes of the present invention or rheological additives comprising them exhibit a stability that is at least comparable, in many cases even better when compared with products obtained from the market containing similar amounts of lithium salts. Therefore, surfactants in general, and some anionic surfactants in particular have been not only identified as complete surrogates for lithium salts, but provide the additional benefit of being fully non-corrosive.

THIXOTROPIC AGENTS

Another object of the present invention is directed to a thixotropic agent comprising the new urea urethane as described above and a solvent. The preferred solvents are aprotic and encompass for example dimethyl formamide, dimethyl acetamide, N-methyl pyrrolidone, N-ethyl pyrrolidone, N-propyl pyrrolidone or N-butyl pyrrolidone or similar alkyl pyrrolidones. Typically, the solvent is present in an amount of from about 20 to about 95% by weight, preferably about 40 to about 80% by weight and more preferably about 50 to about 60% by weight.

Said thixotropic agents may also contain small amounts of lithium salts, in particular of lithium chloride and/or lithium nitrate, which are added to the formulation, but are not present during the formation of the urethanes. The amounts may range from about 0.1 to about 2% wt.-%, preferably from about 0.5 to about 1 wt.-%. These amounts can be helpful for further improving stability of viscosity within a paint or a liquor.

MANUFACTURING PROCESS

Another object of the present invention refers to a process for obtaining a urea urethane, encompassing or consisting of the following steps:
(a) providing a monohydroxyl compound of formula (I)R—OH (I) in which R is n-alkyl or isoalkyl containing 4 to 22 carbon atoms, cycloalkyl containing 6 to 12 carbon atoms, aralkyl containing 7 to 12 carbon atoms or a radical of the formula $C_mH_{2m+1}(O-C_nH_{2n})_x$— or $C_mH_{2m+1}(OOC-C_vH_{2v})_x$—, and m stands for an integer of from 1 to 22, n stands for an integer of 2 to 4, x for an integer of 1 to 15 and v means 4 or 5;
(b) providing a diisocyanate compound of formula (II)

<p align="center">OCN-[A]-NCO    (II)</p> in which A stands for a linear or branched alkylene radical having 2 to 10 carbon atoms and/or a toluylene radical;
(c) reacting said monohydroxyl compound and said diisocyanate compound to form a pre-polymer;
(d) reacting said pre-polymer with a diamine compound, said diamine compound being selected from the group consisting of
(d1) compound (III)

<p align="right">(III)</p> where B stands for a linear, branched and/or cyclical-kylene group having 2 to 12 carbon atoms; and/or
(d2) compound (IV)

<p align="right">(IV)</p> in which a and b represent independent from each other integers from 1 to 5 and Ph stands for a phenyl- or toluylene-radical,
wherein said pre-polymer and said diamine are reacted in the presence of a solvent and a surfactant. The solvent may also be added after the reaction of pre-polymer and diamine.

Monohydroxyl Compounds

Suitable monohydroxyl compounds encompass linear or branched, aliphatic or aromatic alcohols having 4 to 22 and preferably 6 to 12 carbon atoms and their alkylene oxide adducts, preferably adducts of on average 1 to 20, and preferably 2 to 10 mol ethylene oxide, propylene oxide or their mixtures to one of the aforementioned alcohols. Particularly preferred are butanol (all isomers), pentanol, hexanol, heptanol, octanol, nonanol, decanol, undecanol, dodecanol, myristyl alcohol, stearyl alcohol, cetyl alcohol, oleyl alcohol, erucyl alcohol, behenyl alcohol, phenol, benzyl alcohol and their technical mixtures and adducts of 1 to 20 mol, preferably 2 to 10 mol ethylene oxide and/or 1 to 5, preferably 2 to 4 mol propylene oxide.

Particularly preferred, however, are alkyl polyalkylene glycol ethers, preferably alkyl polyethylene glycol ethers having a molecular weight of from about 200 to about 1,000 Dalton, as for example methyl ethers (MPEG) or butyl ethers (BPEG) of PEG100, PEG200, PEG300, PEG350 or PEG500.

Diisocyanate Compounds

While the diisocyanate compound can be of aliphatic origin, the preferred embodiments encompass aromatic or cycloaliphatic compounds or their mixtures, such as for example
Methylendiphenylisocyanat (MDI)
Toluoldiisocyanat (TDI)
Xylylendiisocyanat (XDI)
Hexamethylendiisocyanat (HDI)
Isophorondiisocyanat (IPDI)
4,4-Dicyclohexylmethandiisocyanat (H12MDI)
Particularly preferred is toluylene diisocyanate (also cited as toluol diisocyanate). With regard to the performance of the end product a toluylene diisocyanate encompassing about 50 to about 80 mol-% of the 2,4-isomer is particularly preferred.

Diamine Compound

Suitable diamine compounds encompass aliphatic, cycloaliphatic and aromatic diamines. A suitable diamine is for example <p align="right">(V)</p> in which R''' stands for hydrogen or a methyl group. The preferred species, however, is xylene diamine.

In a particular preferred embodiment the urea urethanes of the present invention are obtained by reacting MPEG300, MPEG350, BPEG300 or BPEG350 with toluylene diisocyanate in a molar ration of from 1:1.05 to 1:1.6 to form a pre-polymer, which is subsequently reacted with xylene diamine to form the final product and is illustrated by the following formula:

Reaction Step 1: Formation of the Pre-Polymer

Key to the present invention is the formation of the pre-polymer, according to which said monohydroxyl compounds and said diisocyanate compounds are reacted in a molar ratio of from about 1:1.05 to about 1:6, more preferably from about 1:1.05 to about 1:3 and even more preferred from about 1:1.1 to about 1:2.5.

Depending on the excess of diisocyanate pre-polymers containing one or two polyether groups are obtained. A disubstituted pre-polymer does not offer a free reaction side for condensation with the amine group, remains as such in the final composition. Applicant, however, has recognized that the dissatisfying performance of the similar products from the market is linked to the amount of unreacted pre-polymers. By reducing the excess of diisocyanate the amount of pre-polymers available for further condensation with the diamine compound—as desired—is significantly increased. This does not only lead to products of improved performance, but also to a composition which is different from the market products and thus novel over the prior art.

Once the pre-polymer is formed it is advantageous removing the unreacted diisocyanate for example by distillation in vacuum. Preferably the remaining pre-polymers show a content of unreacted diisocyanate of less than 0.5% by weight, and preferably about 0.1 to 0.2% by weight.

The specific reaction conditions are illustrated by but not limited to the working examples.

Reaction Step 2: Formation of the Urea Urethane

Subsequently the pre-polymer thus obtained is reacted with a diamine compound, preferably in at least one solvent, preferably an aprotic solvent such as dimethyl formamide, dimethyl acetamide, N-methyl pyrrolidone, N-ethyl pyrrolidone, N-propyl pyrrolidone or N-butyl pyrrolidone or similar alkyl pyrrolidones. Typically, the diamine compound—and optionally also the lithium salt—are dissolved in the solvent and placed into the reactor to which the pre-polymer is added. The preferred solvent is N-methyl pyrrolidone, since it is today not labeled as CMR The molar ratio between pre-polymer and diamine compound is adjusted to about 1:1.2 to 1.2:1, preferably to about 1:1.1 to 1.1:1.

The solids amount can adjusted in broad ranges of from about 5 to about 80% by weight, preferably about 20 to about 60% by weight, and more preferred about 40 to about 50% by weight. The amount to 100% is the solvent, optionally comprising small amounts of suitable additives as for example corrosion inhibitors.

The urea urethanes prepared according to the present invention do not contain either free isocyanate groups or free amino groups. They are accordingly physiologically safe. Furthermore, no adverse side reactions occur with binders or fillers. The storage stability of these urea urethane solutions prepared in this way is extraordinarily high and is certainly 6 months or more at, normal storage temperature.

Surfactants

Key to the invention is conducted the urethane formation in the presence of surfactants instead of lithium salts. To avoid any ambiguity a surfactant is understood being any substance capable of lowering surface tension (or interfacial tension) between two liquids or between a liquid and a solid.

Suitable surfactants according to the invention encompass, anionic, non-ionic, cationic, amphoteric and zwitterionic surfactants and of course their mixtures. Particular preferred are surfactants of anionic type and/or showing an HLB value in the range of 8 to 12 and being soluble in used solvent and polymer mixture Anionic Surfactants Preferably, surfactants of the sulfonate type, alk(en)yl sulfonates, alkoxylated alk(en)yl sulfates, ester sulfonates and/or soaps are used as the anionic surfactants. Suitable surfactants of the sulfonate type are advantageously $C_{9-13}$ alkylbenzene sulfonates, olefin sulfonates, i.e. mixtures of alkene- and hydroxyalkane sulfonates, and disulfonates, as are obtained, for example, by the sulfonation with gaseous sulfur trioxide of $C_{12-18}$ monoolefins having a terminal or internal double bond and subsequent alkaline or acidic hydrolysis of the sulfonation products.

Alk(en)yl Sulfates.

Preferred alk(en)yl sulfates are the alkali and especially the sodium salts of the sulfuric acid half-esters of the $C_{12}$-$C_{18}$ fatty alcohols, for example, from coconut butter alcohol, tallow alcohol, lauryl, myristyl, cetyl or stearyl alcohol or from $C_8$-$C_{20}$ oxo alcohols and those half-esters of secondary alcohols of these chain lengths. Alk(en)yl sulfates of the cited chain lengths that comprise a synthetic straight chain alkyl group manufactured petrochemically are also preferred. The $C_{12}$-$C_{16}$ alkyl sulfates and $C_{12}$-$C_{15}$ alkyl sulfates as well as $C_{14}$-$C_{15}$ alkyl sulfates and $C_{14}$-$C_{16}$ alkyl sulfates are particularly preferred on the grounds of laundry performance. The 2,3-alkyl sulfates, which can be obtained from Shell Oil Company under the trade name DAN™, are also suitable anionic surfactants.

Alk(en)yl Ether Sulfates.

Sulfuric acid mono-esters derived from straight-chained or branched $C_7$-$C_{21}$ alcohols ethoxylated with 1 to 6 moles ethylene oxide are also suitable, such as 2-methyl-branched $C_9$-$C_{11}$ alcohols with an average of 3.5 mol ethylene oxide (EO) or $C_{12}$-$C_{19}$ fatty alcohols with 1 to 4 EO.

Ester Sulfonates.

The esters of alpha-sulfo fatty acids (ester sulfonates), e.g., the alpha-sulfonated methyl esters of hydrogenated coco-, palm nut- or tallow acids are likewise suitable.

Soaps.

Soaps, in particular, can be considered as further anionic surfactants. Saturated fatty acid soaps are particularly suitable, such as the salts of lauric acid, myristic acid, palmitic acid, stearic acid, hydrogenated erucic acid and behenic acid, and especially soap mixtures derived from natural fatty acids such as coconut oil fatty acid, palm kernel oil fatty acid or tallow fatty acid. Those soap mixtures are particularly preferred that are composed of 50 to 100 wt. % of saturated $C_{12}$-$C_{24}$ fatty acid soaps and 0 to 50 wt. % of oleic acid soap.

Ether Carboxylic Acids.

A further class of anionic surfactants is that of the ether carboxylic acids, obtainable by treating fatty alcohol ethoxylates with sodium chloroacetate in the presence of basic catalysts. They have the general formula:

with $R=C_1-C_{18}$alkyl and p=0.1 to 20. Ether carboxylic acids are insensitive to water hardness and possess excellent surfactant properties.

Sulfosuccinates.

Overall preferred are anionic surfactants of the sulfosuccinate type. Sulfosuccinates represent sulfonation products of succinic acid mono and diesters having the general formula With $R^1$=H, $C_1$-$C_{18}$ alkyl, $R^2$=$C_1$-$C_{18}$ alkyl and X=alkali, alkaline earth, ammonium or alkyl ammonium. The preferred sulfosuccinates represent mono or diesters of lineare or branched alcohols having 6 to 12 and preferably 8 atoms, such as octanol or 2-ethylhexyl alcohol. The structures may also incorporate polyalkylene glycol groups, such as for example 1 to 10 moles of ethylene oxide and/or propylene oxide. These structures (also called ether sulfosuccinates) are derived from the respective adducts of alkylene oxides to alcohols.

Nonionic Surfactants

Alcohol Alkoxylates.

The added nonionic surfactants are preferably alkoxylated and/or propoxylated, particularly primary alcohols having preferably 8 to 18 carbon atoms and an average of 1 to 12 mol ethylene oxide (EO) and/or 1 to 10 mol propylene oxide (PO) per mol alcohol. $C_8$-$C_{16}$-Alcohol alkoxylates, advantageously ethoxylated and/or propoxylated $C_{10}$-$C_{15}$-alcohol alkoxylates, particularly $C_{12}$-$C_{14}$ alcohol alkoxylates, with an ethoxylation degree between 2 and 10, preferably between 3 and 8, and/or a propoxylation degree between 1 and 6, preferably between 1.5 and 5, are particularly preferred. The cited degrees of ethoxylation and propoxylation constitute statistical average values that can be a whole or a fractional number for a specific product. Preferred alcohol ethoxylates and propoxylates have a narrowed homolog distribution (narrow range ethoxylates/propoxylates, NRE/NRP). In addition to these nonionic surfactants, fatty alcohols with more than 12 EO can also be used. Examples of these are (tallow) fatty alcohols with 14 EO, 16 EO, 20 EO, 25 EO, 30 EO or 40 EO.

Alkylglycosides (APG®).

Furthermore, as additional nonionic surfactants, alkyl glycosides that satisfy the general Formula RO(G)$_x$, can be added, e.g., as compounds, particularly with anionic surfactants, in which R means a primary linear or methyl-branched, particularly 2-methyl-branched, aliphatic group containing 8 to 22, preferably 12 to 18 carbon atoms and G stands for a glycose unit containing 5 or 6 carbon atoms, preferably for glucose. The degree of oligomerization x, which defines the distribution of monoglycosides and oligoglycosides, is any number between 1 and 10, preferably between 1.1 and 1.4.

Fatty Acid Ester Alkoxylates.

Another class of preferred nonionic surfactants, which are used either as the sole nonionic surfactant or in combination with other nonionic surfactants, in particular, together with alkoxylated fatty alcohols and/or alkyl glycosides, are alkoxylated, preferably ethoxylated or ethoxylated and propoxylated fatty acid alkyl esters preferably containing 1 to 4 carbon atoms in the alkyl chain, more particularly the fatty acid methyl esters which are described, for example, in Japanese Patent Application JP-A-58/217598 or which are preferably produced by the process described in International Patent Application WO-A-90/13533. Methyl esters of $C_{12}$-$C_{18}$ fatty acids containing an average of 3 to 15 EO, particularly containing an average of 5 to 12 EO, are particularly preferred.

Amine Oxides.

Nonionic surfactants of the amine oxide type, for example, N-coco alkyl-N,N-dimethylamine oxide and N-tallow alkyl-N,N-dihydroxyethylamine oxide, and the fatty acid alkanolamides may also be suitable. The quantity in which these nonionic surfactants are used is preferably no more than the quantity in which the ethoxylated fatty alcohols are used and, particularly no more than half that quantity.

Gemini Surfactants.

The so-called gemini surfactants can be considered as further surfactants. Generally speaking, such compounds are understood to mean compounds that have two hydrophilic groups and two hydrophobic groups per molecule. As a rule, these groups are separated from one another by a "spacer". The spacer is usually a hydrocarbon chain that is intended to be long enough such that the hydrophilic groups are a sufficient distance apart to be able to act independently of one another. These types of surfactants are generally characterized by an unusually low critical micelle concentration and the ability to strongly reduce the surface tension of water. In exceptional cases, however, not only dimeric but also trimeric surfactants are meant by the term gemini surfactants. Suitable gemini surfactants are, for example, sulfated hydroxy mixed ethers according to German Patent Application DE 4321022 A1 or dimer alcohol bis- and trimer alcohol tris sulfates and ether sulfates according to International Patent Application WO 96/23768 A1. Blocked end group dimeric and trimeric mixed ethers according to German Patent Application DE 19513391 A1 are especially characterized by their bifunctionality and multifunctionality. Gemini polyhydroxyfatty acid amides or polyhydroxyfatty acid amides, such as those described in International Patent Applications WO 95/19953 A1, WO 95/19954 A1 and WO 95/19955 A1 can also be used.

Cationic Surfactants

Tetraalkyl Ammonium Salts.

Cationically active surfactants comprise the hydrophobic high molecular group required for the surface activity in the cation by dissociation in aqueous solution. A group of important representatives of the cationic surfactants are the tetraalkyl ammonium salts of the general formula: $(R^1R^2R^3R^4N^+)$ $X^-$. Here R1 stands for $C_1$-$C_8$ alk(en)yl, $R^2$, $R^3$ and $R^4$, independently of each other, for alk(en)yl radicals having 1 to 22 carbon atoms. X is a counter ion, preferably selected from the group of the halides, alkyl sulfates and alkyl carbonates. Cationic surfactants, in which the nitrogen group is substituted with two long acyl groups and two short alk(en)yl groups, are particularly preferred.

Esterquats.

A further class of cationic surfactants particularly useful as co-surfactants for the present invention is represented by the so-called esterquats. Esterquats are generally understood to be quaternised fatty acid triethanolamine ester salts. These are known compounds which can be obtained by the relevant methods of preparative organic chemistry. Reference is made in this connection to International patent application WO 91/01295 A1, according to which triethanolamine is partly esterified with fatty acids in the presence of hypophosphorous acid, air is passed through the reaction mixture and the whole is then quaternised with dimethyl sulphate or ethylene oxide. In addition, German patent DE 4308794 C1 describes a process for the production of solid esterquats in which the quaternisation of triethanolamine esters is carried out in the presence of suitable dispersants, preferably fatty alcohols.

Typical examples of esterquats suitable for use in accordance with the invention are products of which the acyl component derives from monocarboxylic acids corresponding to formula RCOOH in which RCO is an acyl group containing 6 to 10 carbon atoms, and the amine component is triethanolamine (TEA). Examples of such monocarboxylic acids are caproic acid, caprylic acid, capric acid and technical mixtures thereof such as, for example, so-called head-fractionated fatty acid. Esterquats of which the acyl component derives from monocarboxylic acids containing 8 to 10 carbon atoms, are preferably used. Other esterquats are those of which the acyl component derives from dicarboxylic acids like malonic acid, succinic acid, maleic acid, fumaric acid, glutaric acid, sorbic acid, pimelic acid, azelaic acid, sebacic acid and/or dodecanedioic acid, but preferably adipic acid. Overall, esterquats of which the acyl component derives from mixtures of monocarboxylic acids containing 6 to 22 carbon atoms, and adipic acid are preferably used. The molar ratio of mono and dicarboxylic acids in the final esterquat may be in the range from 1:99 to 99:1 and is preferably in the range from 50:50 to 90:10 and more particularly in the range from 70:30 to 80:20. Besides the quaternised fatty acid triethanolamine ester salts, other suitable esterquats are quaternized ester salts of mono-/dicarboxylic acid mixtures with diethanolalkyamines or 1,2-dihydroxypropyl dialkylamines. The esterquats may be obtained both from fatty acids and from the corresponding triglycerides in admixture with the corresponding dicarboxylic acids. One such process, which is intended to be representative of the relevant prior art, is proposed in European patent EP 0750606 B1. To produce the quaternised esters, the mixtures of mono- and dicarboxylic acids and the triethanolamine—based on the available carboxyl functions—may be used in a molar ratio of 1.1:1 to 3:1. With the performance properties of the esterquats in mind, a ratio of 1.2:1 to 2.2:1 and preferably 1.5:1 to 1.9:1 has proved to be particularly advantageous. The preferred esterquats are technical mixtures of mono-, di- and triesters with an average degree of esterification of 1.5 to 1.9.

Amphoteric or Zwitterionic Surfactants

Betaines.

Amphoteric or ampholytic surfactants possess a plurality of functional groups that can ionize in aqueous solution and thereby—depending on the conditions of the medium—lend anionic or cationic character to the compounds (see DIN 53900, July 1972). Close to the isoelectric point (around pH 4), the amphoteric surfactants form inner salts, thus becoming poorly soluble or insoluble in water. Amphoteric surfactants are subdivided into ampholytes and betaines, the latter existing as zwitterions in solution. Ampholytes are amphoteric electrolytes, i.e. compounds that possess both acidic as well as basic hydrophilic groups and therefore behave as acids or as bases depending on the conditions. Especially betaines are known surfactants which are mainly produced by carboxyalkylation, preferably carboxymethylation, of amine compounds. The starting materials are preferably condensed with halocarboxylic acids or salts thereof, more particularly sodium chloroacetate, one mole of salt being formed per mole of betaine. The addition of unsaturated carboxylic acids, such as acrylic acid for example, is also possible. Examples of suitable betaines are the carboxyalkylation products of secondary and, in particular, tertiary amines which correspond to formula $R^1R^2R^3N—(CH_2)_q COOX$ where $R^1$ is a an alkyl radical having 6 to 22 carbon atoms, $R^2$ is hydrogen or an alkyl group containing 1 to 4 carbon atoms, $R^3$ is an alkyl group containing 1 to 4 carbon atoms, q is a number of 1 to 6 and X is an alkali and/or alkaline earth metal or ammonium. Typical examples are the carboxymethylation products of hexylmethylamine, hexyldimethylamine, octyldimethylamine, decyldimethylamine, $C_{12/14}$-cocoalkyldimethyl-amine, myristyldimethylamine, cetyldimethylamine, stearyldimethylamine, stearylethyl-methylamine, oleyldimethylamine, $C_{16/18}$-tallowalkyldimethylamine and their technical mixtures, and particularly dodecyl methylamine, dodecyl dimethylamine, dodecyl ethylmethylamine and technical mixtures thereof.

Alkylamido Betaines.

Other suitable betaines are the carboxyalkylation products of amidoamines corresponding to formula $R^1CO(R^3)(R^4)—NH—(CH_2)_p—N—(CH_2)_q COOX$ in which $R^1CO$ is an aliphatic acyl radical having 6 to 22 carbon atoms and 0 or 1 to 3 double bonds, $R^2$ is hydrogen or an alkyl radical having 1 to 4 carbon atoms, $R^3$ is an alkyl radical having 1 to 4 carbon atoms, p is a number from 1 to 6, q is a number from 1 to 3 and X is an alkali and/or alkaline earth metal or ammonium. Typical examples are reaction products of fatty acids having 6 to 22 carbon atoms, like for example caproic acid, caprylic acid, caprinic acid, lauric acid, myristic acid, palmitic acid, palmoleic acid, stearic acid, isostearic acid, oleic acid, elaidic acid, petroselinic acid, linolic acid linoleic acid, elaeostearic acid, arachidonic acid, gadoleic acid, behenic acid, erucic acid and their technical mixtures with N,N-dimethylaminoethylamine, N,N-dimethylaminopropylamine, N,N-diethylaminoethylamine and N,N-diethylaminopropylamine, which are condensed with sodium chloroacetate. The commercially available products include Dehyton® K and Dehyton® PK (Cognis Deutschland GmbH & Co., KG) as well as Tego® Betaine (Goldschmidt).

Imidazolines, Other suitable starting materials for the betaines to be used for the purposes of the invention are imidazolines. These substances are also known and may be obtained, for example, by cyclizing condensation of 1 or 2 moles of $C_6$-$C_{22}$ fatty acids with polyfunctional amines, such as for example aminoethyl ethanolamine (AEEA) or diethylenetriamine. The corresponding carboxyalkylation products are mixtures of different open-chain betaines. Typical examples are condensation products of the above-mentioned fatty acids with AEEA, preferably imidazolines based on lauric acid, which are subsequently betainised with sodium chloroacetate. The commercially available products include Dehyton® G (Cognis Deutschland GmbH & Co., KG).

The amount of surfactants is about 0.2 to about 2 mol, preferably about 0.5 to about 1.5 mol, particularly preferred about 0.75 to about 1.25 mol of surfactant, calculated on the amine equivalent of the diamine used.

INDUSTRIAL APPLICATION

Another object of the present invention refers to a method for adjusting the rheological properties of a paint, a lacquer or a coating composition encompassing the following steps:
(i) providing a non-solid paint, lacquer or coating composition; and
(ii) adding a working amount of the urea urethane, the agent or the product obtained according to the process—all as described above.

Finally, the present invention also encompasses the use of the urea urethane, the agent or the product obtained according to the process—all as described above—as a rheology modifier, particularly for non-solid paints, lacquers and coating compositions.

EXAMPLES

General Manufacturing Procedure

A Synthesis of Mono Isocyanate with Glycol Compounds

A 1-l-reactor was loaded with diisocyanate and placed under a nitrogen blanket at 25° C. The glycol compound was added dropwise to the mixture while stirring. The temperature did not exceed above 35° C. After completing the addition the reaction was followed on NCO content and stopped when the NCO content had reached a value corresponding to the theoretical amount for a mono adduct. Subsequently the excess of diisocyanate was evaporated at 150 to 175° C. under vacuum. A slightly brown product was obtained. The final NCO content was in each case less than 7% and the product showed a viscosity of about 400 to about 500 mPas (measured at 25° C.). The final free diisocyanate content was below 0.1%

B Synthesis of Polyurea Based on Monoisocyanate from Example 1A

The reactor was loaded with surfactant, about 220 g n-Butyl pyrrolidone (NBP) and 4.5 wt.-% m-xylene diamine calculated on the NCO content. The mixtures were heated under stirring up to 95° C. Once the surfactant was completely dissolved, a homogeneous mixture of about 180 g mono-adduct from example A and 72.50 g NBP was added in approximate 1 hour. The reaction mixture was stirred for about 50 minutes and cooled down to room temperature once no NCO signal was found in IR. Clear low viscous products were observed.

The following Tables 1 and 2 provide the parameters for the various working examples and the components used for preparing the polyurethanes:

TABLE 1

| Parameters | 1 | 2 | 3 | 4 | 5 | 6 | 7 | 8 | 9 | 10 |
|---|---|---|---|---|---|---|---|---|---|---|
| Reaction conditions | | | | | | | | | | |
| A | | | | | Isocyanate | | | | | |
| Type | A1 | A1 | A1 | A1 | A2 | A1 | A2 | A1 | A2 | A1 |
| Amount [g] | 209 | 261 | 348 | 870 | 375 | 261 | 375 | 261 | 375 | 261 |
| Amount [mol] | 1.2 | 1.5 | 2.0 | 3.0 | 1.5 | 1.5 | 1.5 | 1.5 | 1.5 | 1.5 |
| B | | | | | Glycol compound | | | | | |
| Type | B1 | B1 | B1 | B1 | B1 | B1 | B2 | B1 | B2 | B1 |
| Amount [g] | 382 | 382 | 382 | 382 | 382 | 382 | 455 | 382 | 455 | 382 |
| Amount [mol] | 1.0 | 1.0 | 1.0 | 1.0 | 1.0 | 1.0 | 1.0 | 1.0 | 1.0 | 1.0 |
| C | | | | | Surfactant | | | | | |
| Type | C1 | C1 | C1 | C1 | C1 | C2 | C3 | C4 | C5 | C6 |
| Amount [wt.-%]* | 1.2 | 1.4 | 1.4 | 1.5 | 1.2 | 1.2 | 1.2 | 1.2 | 1.2 | 1.2 |

*Amount calculated on the amine equivalent of the diamine used

TABLE 2

| | Materials | |
|---|---|---|
| A1 | Toluene diisocyanate (80% 2,4 isomer) | Desmodur T80 |
| A2 | Diphenylmethan diisocyanate | Desmodur MDI |
| B1 | Polyethylene glycol monobutyl ether (MW: 382) | BPEG |
| B2 | Polyethylene glycol monomethyl ether (MW: 350) | MPEG |
| C1 | Dioctyl sulfosuccinate sodium salt | |
| C2 | Octyl sulfate sodium salt | Sulfopon O |
| C3 | Laurylalcohol + 2E0 sulfate sodium salt | Texapon N70 |
| C4 | Laureth-2 | |
| C5 | Cocamidopropyl betaine | Tegobetain |
| C6 | Coco glucosides | Glucopon |

APPLICATION EXAMPLES

The product of Manufacturing Example 1 was compared against a Market product(C1) and a Comparative Product (C2) which was obtained according to the following procedure:

A first 1-l-reactor was loaded with 209 g (1.2 moles) toluene diisocyanate and placed under a nitrogen blanket at 25° C. 382 g (1.0 mole) polyethylene glycol monobutyl ether was added dropwise to the mixture while stirring. The temperature did not exceed above 35° C. After completing the addition the reaction was followed on NCO content and stopped when the NCO content had reached a value corresponding to the theoretical amount for a mono adduct. Subsequently the excess of diisocyanate was evaporated at 150 to 175° C. under vacuum. A slightly brown product was obtained. The final NCO content was in each case less than 7% and the product showed a viscosity of about 400 to about 500 mPas. The final free diisocyanate content was below 0.1%. A second 1-l-reactor was loaded with 1.2 wt.-% lithium chloride, 220 g n-butyl pyrrolidone (NBP) and 22.5 g m-xylene diamine (4.5 wt.-% calculated on the NCO content). The mixture was heated under stirring up to 95° C. Once the salt was completely dissolved, a homogeneous mixture of about 180 g mono-adduct from as obtained above and 72.50 g NBP were added in approximate 1 hour. The reaction mixture was stirred for about 50 minutes and cooled down to room temperature once no NCO signal was found in IR. A clear low viscous product was observed.

All three products were added at 1.2 and 1.7 wt.-% to a standard xylene based paint formulation and as well to a butyl acetate lacquer formulation. FIGS. 1 to 4 provide information about stability of the compositions in a tan 5 versus time diagram. From the results one can see that the products according to the present invention act on the same level compared to the comparative products, in some cases stability is even better.

The figures show the tan delta which is G"/G' (Viscous loss modulus/Elastic storage modulus). A tan delta value below 1 means that elastic modulus is dominant and that the material behaves like a solid. Values above 1 means that the material is behaving like a (viscous) liquid.

Figure 1:
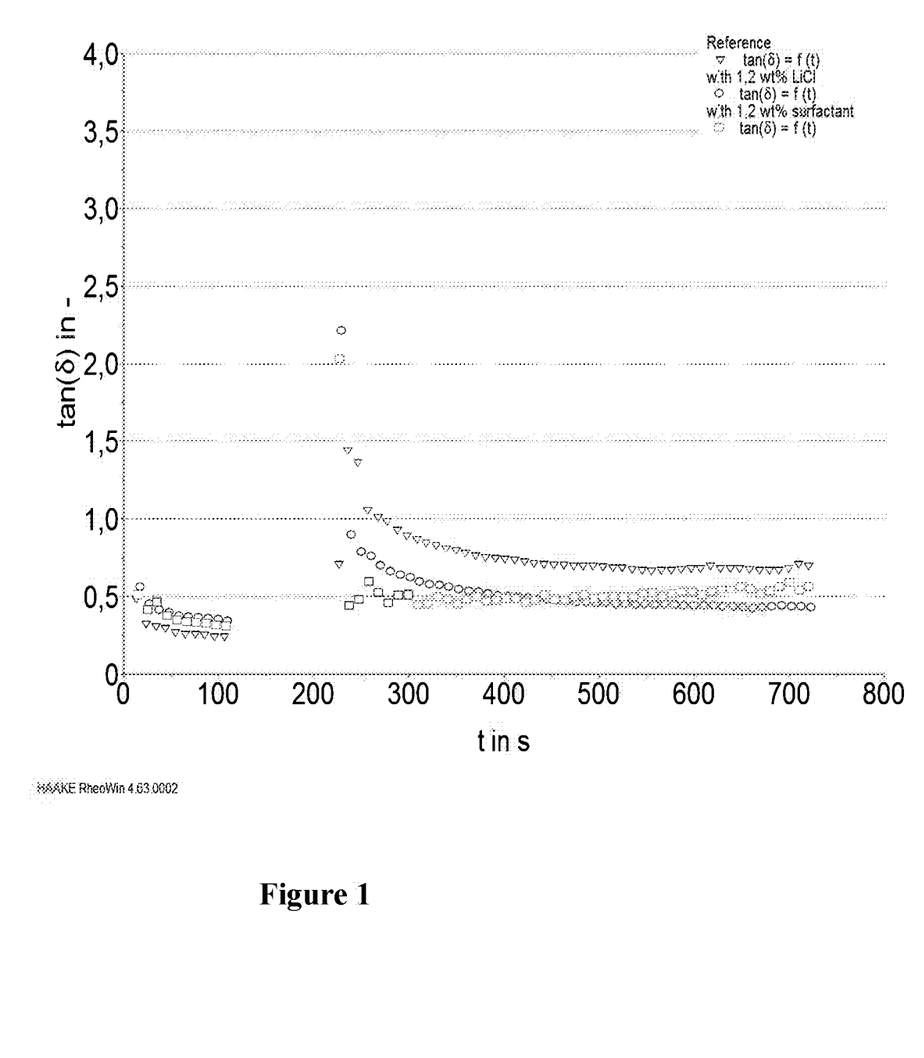
FIGS. 1-3 provide information about stability of the compositions in a tan 5 versus time graph.
Figure 2:
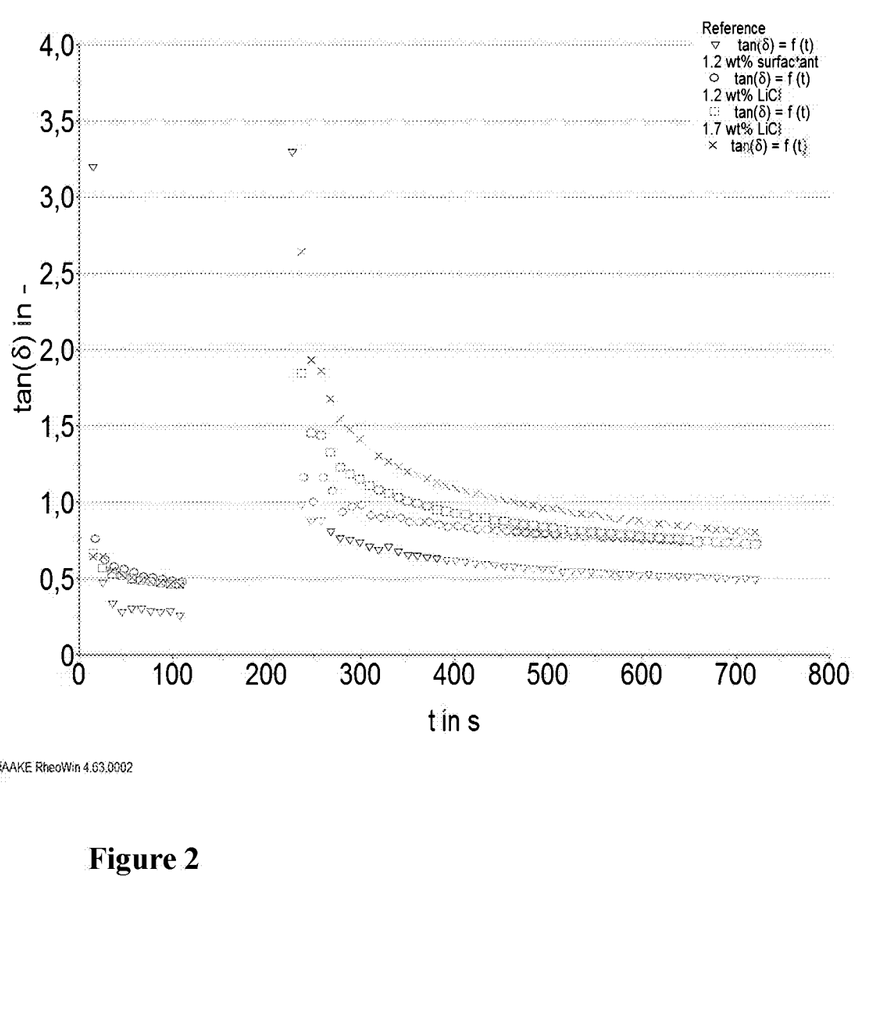
Figure 3:
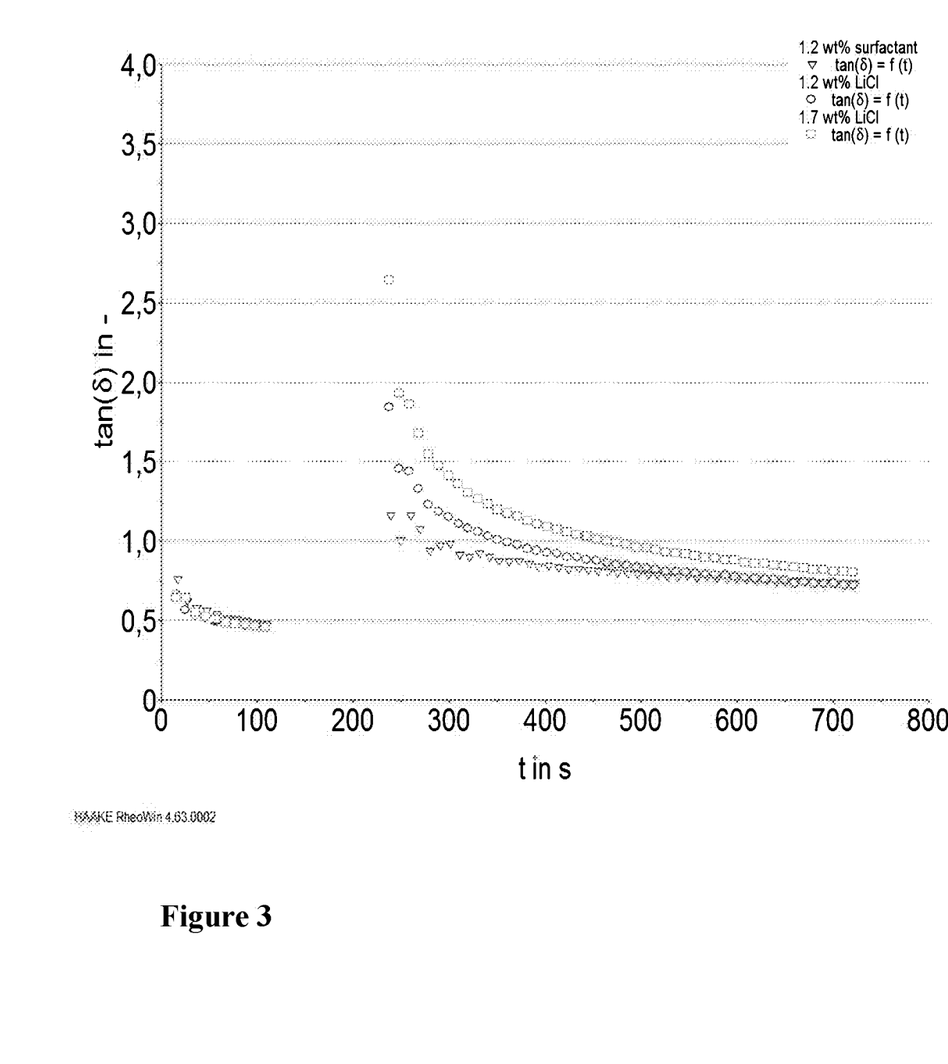

The first part (0-120 sec.) of the graph is to measure the structure in the paint formulation after applying.

The second part (120-240 sec., not visible in the graph) of the graph is to destroy all the structure in the paint sample.

The third part (240-720 sec.) of the graph is to measure the re-networking of the paint sample after destroying. This part should recover as soon as possible to the same level as the first part (at least <1).

G": Elastic Storage modulus: The ability of the material to store energy.

G': Viscous Loss Modulus: The ability of the material to dissipate energy (energy lost as heat).

The product according to the present invention and the comparative product containing LiCl were introduced into a solvent gel test. The results are provided in Table 3:

TABLE 3

Solvent gel tests

Solvent tests (6% addition to solvent)

| Product | wt.-% | Water | Ethanol | Ethylacetate | Butylacetate | Xylene |
|---|---|---|---|---|---|---|
| Example E1 | 1, 2 | precipitates white gel | strong, haze strong gel, hazy | gel, hazy strong gel | gel, hazy strong gel, hazy | gel, hazy strong gel |
| C2 | 1, 2 | precipitates | strong gel, hazy | liquid/ precipitates | partly gel | weak gel |
| C2 | 1, 7 | precipitates | strong gel, white | liquid | liquid | liquid |

Method:

6 wt.-% of thickener (corrected on solids) is added to the pure solvent. The rheology modifier is mixed by hand. A gel should be formed after 2 hours. The mixture is visual checked by turning the vial. The stronger the gel, the better the performances in a clear solvent.

Figure 4:
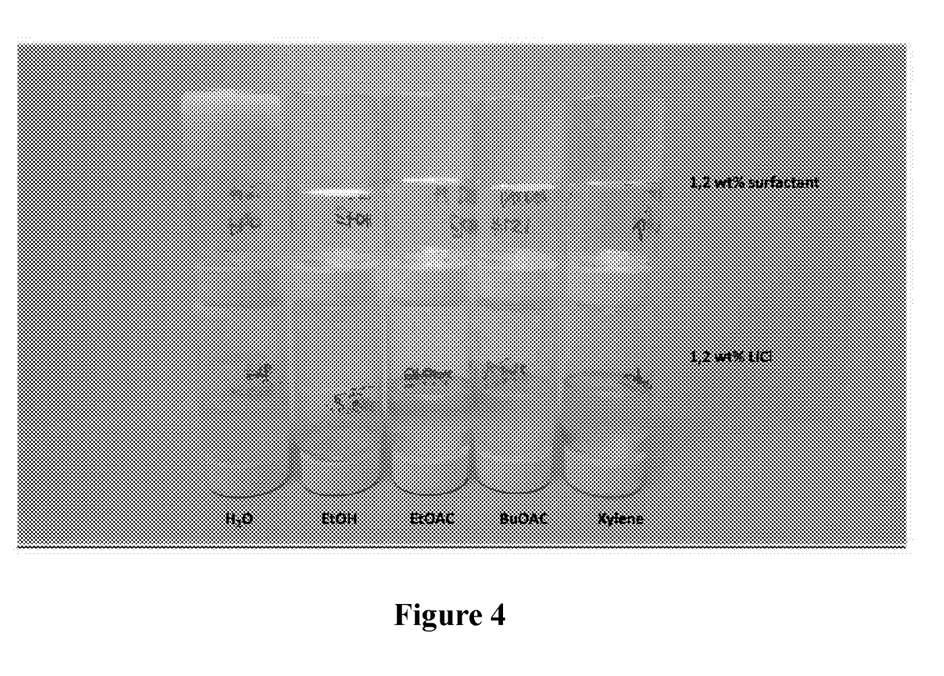
FIG. 4 is a photograph of the results according to the present invention and the LiCl-based comparison.

The product according to the present invention showed a better gel performance when compared to the LiCl-based comparison. The results are also shown in FIG. 4.

The invention claimed is:

1. A urea urethane obtained according to a process comprising the following steps:

(a) providing a monohydroxyl compound of formula (I)

R—OH      (I)

in which R is selected from the group consisting of n-alkyl or isoalkyl containing from 4 to about 22 carbon atoms, cycloalkyl containing from 6 to about 12 carbon atoms, aralkyl containing from 7 to about 12 carbon atoms and a radical of the formula:

$C_mH_{2m+1}(O-C_nH_{2n})_x-$ or $C_mH_{2m+1}(OOC-C_vH_{2v})_x-$, where m is an integer of from 1 to 22, n is an integer of from 2 to 4, x is an integer of from 1 to 15 and v is 4 or 5;

(b) providing a diisocyanate compound of formula (II)

OCN-[A]-NCO      (II)

in which A is selected from the group consisting of a linear or branched alkylene radical having from 2 to 10 carbon atoms and a toluylene radical;

(c) reacting said monohydroxyl compound and said diisocyanate compound to form a pre-polymer;

(d) reacting said pre-polymer with a diamine compound, said diamine compound being selected from the group consisting of (d1) compound (III)

$H_2N-[B]-NH_2$      (III)

where B is a linear, branched or cyclicalkylene group having from 2 to 12 carbon atoms; and/or (d2) compound (IV)

$H_2N-(CH_2)_a-Ph-(CH_2)_b-NH_2$      (IV)

in which a and b are integers of from 1 to 5 and are independent of each other, and Ph is a phenyl radical, wherein said pre-polymer and said diamine are reacted in the presence of an anionic surfactant and absence of lithium salt.

2. The urea urethane of claim 1, wherein said monohydroxyl compound is an alkyl polyalkylene glycol ether having a molecular weight of from about 200 to about 1,000 Daltons.

3. The urea urethane of claim 1, wherein said diisocyanate compound is toluylene diisocyanate.

4. The urea urethane of claim 1, wherein said monohydroxyl compound and said diisocyanate compound are reacted in a molar ratio of from 1:1.05 to 1:6.

5. The urea urethane of claim 1, wherein the diamine compound is xylene diamine.

6. The urea urethane of claim 1, wherein the surfactant is an anionic surfactant.

7. The urea urethane of claim 6, wherein the surfactant is a sulfosuccinate.

8. The urea urethane of claim 1, wherein the surfactants are present in an amount of from about 1.0 to about 2.0 wt.-% calculated on the weight of the total reaction mixture.

9. The urea urethane of claim 1, wherein said pre-polymer and said diamine compound are reacted in an aprotic solvent.

10. A thixotropic agent comprising the urea urethane of claim 1 and a solvent.

11. The thixotropic agent of claim 10, wherein the solvent is present in an amount of from about 20 to about 95% by weight.

12. The thixotropic agent of claim 10 further comprising a lithium salt.

13. A process for obtaining a urea urethane comprising the following steps:

(a) providing a monohydroxyl compound of formula (I)

$$R\text{—}OH \quad (I)$$

in which R is selected from the group consisting of n-alkyl or isoalkyl containing from 4 to about 22 carbon atoms, cycloalkyl containing from 6 to about 12 carbon atoms, aralkyl containing from 7 to about 12 carbon atoms and a radical of the formula:

$$C_mH_{2m+1}(O\text{—}C_nH_{2n})_x\text{—} \quad \text{or} \quad C_mH_{2m+1}(OOC\text{—}C_vH_{2v})_x\text{—},$$

where m is an integer of from 1 to 22, n is an integer of from 2 to 4, x is an integer of from 1 to 15 and v is 4 or 5;

(b) providing a diisocyanate compound of formula (II)

$$OCN\text{-}[A]\text{-}NCO \quad (II)$$

in which A is selected from the group consisting of a linear or branched alkylene radical having from 2 to 10 carbon atoms and a toluylene radical;

(c) reacting said monohydroxyl compound and said diisocyanate compound to form a pre-polymer;

(d) reacting said pre-polymer with a diamine compound, said diamine compound being selected from the group consisting of (d1) compound (III)

$$H_2N\text{-}[B]\text{-}NH_2 \quad (III)$$

where B is a linear, branched or cyclicalkylene group having from 2 to 12 carbon atoms; and/or (d2) compound (IV)

$$H_2N\text{—}(CH_2)_a\text{-}Ph\text{-}(CH_2)_b NH_2 \quad (IV)$$

in which a and b are integers of from 1 to 5 and are independent of each other, and Ph is a phenyl radical, wherein said pre-polymer and said diamine are reacted in the presence of an anionic surfactant and absence of lithium salt.

14. A method for adjusting the rheological properties of a paint, a lacquer or a coating composition comprising the following steps:
(i) providing a non-solid paint, lacquer or coating composition; and
(ii) adding a working amount of the urea urethane of claim 1.

15. A method comprising employing the urea urethane of claim 1 as a rheology modifier.

16. A method for adjusting the rheological properties of a paint, a lacquer or a coating composition comprising the following steps:
(i) providing a non-solid paint, lacquer or coating composition; and
(ii) adding a working amount of the thixotropic agent of claim 10.

17. A method for adjusting the rheological properties of a paint, a lacquer or a coating composition comprising the following steps:
(i) providing a non-solid paint, lacquer or coating composition; and
(ii) adding a working amount of the product obtained from the process of claim 13.

18. A method comprising employing the thixotropic agent of claim 10 as a rheology modifier.

19. A method comprising employing the product obtained from the process of claim 13 as a rheology modifier.

20. The urea-urethane of claim 1, wherein the anionic surfactant is a sulfosuccinate.

21. The method of claim 13, wherein the anionic surfactant is a sulfosuccinate.

22. The urea urethane of claim 2, wherein said alkyl polyalkylene glycol ether is selected from the group consisting of methyl ethers and butyl ethers of PEG100, PEG200, PEG300, PEG350, PEG500, and mixtures thereof.

\* \* \* \* \*